United States Patent Office 3,775,409
Patented Nov. 27, 1973

3,775,409
1,3-THIAZINES
Kálmán Hársányi, Károly Nádor, Kálmán Takács, Dezsö Korbonits, Pál Kiss, Antal Simay, István Bodrogi, László Tardos, and György Leszkovszky, Budapest, Hungary, assignors to Chinoin Gyogyszer es Vegyeszeti Termekek Gyard Rt., Budapest, Hungary
No Drawing. Filed Oct. 31, 1969, Ser. No. 873,113
Claims priority, application Hunngary, Nov. 8, 1968, CI–832
Int. Cl. C07d 93/08
U.S. Cl. 260—243 R
13 Claims

ABSTRACT OF THE DISCLOSURE

A compound selected from the group which consists of a compound of the formula

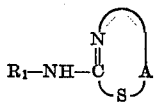

wherein $R_1$ stands for the hydrogenated or nonhydrogenated naphthyl radical or a naphthalene group containing an organic substituent with 1 to 6 carbon atoms and A stands for a group of the formula —$CH_2$—$CH(R_2)$—, —$CH_2$—$CH(R_3)$—$CH_2$— or —$CH(R_3)$—$CH_2$—$CH_2$—, wherein $R_2$ stands for an alkyl group with 1 to 7 carbon atoms and $R_3$ stands for a hydrogen atom or an alkyl having 1 to 7 carbon atoms, and the pharmaceutically acceptable acid addition salts of the compound of said formula.

This invention is directed to new heterocyclic compounds, a process for the preparation thereof and compositions comprising same. More particularly, it is concerned with new cyclic isothiourea derivatives, wherein the nitrogen and the sulfur atoms of the isothiourea structure take part in the formation of the heterocyclic ring, which comprises 5- or 6-members, a process for the preparation thereof and compositions comprising same.

Accordingly the compounds according to the present invention are 2-amino-thiazolines or 2-imino-thiazolidines and 2-amino-4H-5,6-dihydro-1,3-thiazines or 2-imino-tetrahydro-1,3-thiazines respectively.

It is known that 2-(naphthyl-1-amino)-Δ²-thiazoline may be prepared by the interaction of 1-naphthyl-isothiocyanate and β-amino-ethanol (Bull. Soc. Chim., France, 1960, 960).

It is known further that 2-phenylamino-4H-5,6-dihydro-1,3-thiazine may be prepared by reacting phenylisothiocyanate with 3-amino-propanol-(1) and treating the product thus obtained with an acid, or by reacting phenylthiourea with 1-3-dihalogeno-propane, or by reacting aniline with γ-halogeno-propyl-isothiocyanate, or by reacting aniline with 2-amino-, 2-mercapto- or 2-alkylmercapto-4H-5,6-dihydro-1,3-thiazine (German Pat. No. 1,173,475). No pharmaceutical activity of said compound is disclosed.

According to a feature of the present invention, there are provided new compounds of the general formulae

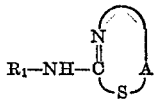   (I)

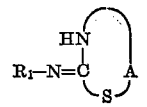   (II)

and

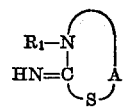   (III)

wherein $R_1$ stands for a naphthyl radical, which may be optionally substituted and optionally hydrogenated, and A stands for a member of the group which consists of —$CH_2$—$CH(R_2)$, —$CH_2$—$CH(R_3)$—$CH_2$— or

—$CH(R_3)$—$CH_2$—$CH_2$—, wherein $R_2$ stands for an alkyl, aralkyl or aryl radical and $R_3$ stands for hydrogen atom, or an alkyl, aralkyl or aryl radical and salts thereof.

The new compounds of the Formulae I, II and III are therapeutically useful substances, which may be used in pharmacy, first of all as sedative, tranquillant, spasmolytic and prolonged hypotensive agents.

The compounds of the Formulae I and II are tautomers, while the compounds of the Formula III are structural isomers of the compounds of the Formula II.

$R_1$ stands preferably for a 1-naphthyl-, 2-naphthyl-, 5,6,7,8-tetrahydro-1-naphthyl- or 5,6,7,8 - tetrahydro-2-naphthyl-radical. The naphthalene moiety may contain one or more substituents on either of the condensed rings. Said substituents may be the same, or different. The naphthyl-ring may be preferably substituted by one, or more of the following groups: alkyl, preferably containing 1–6 carbon atoms (e.g. methyl or ethyl), alkoxy-groups, preferably containing 1–6 carbon atoms, such as methoxy, or ethoxy; halogen atoms, particularly chlorine or bromine; nitro, amino, sulfamoyl, carboxy, or a carboxylic acid-derivative-radical, particularly an ester-, amido- or nitrile-group; or an acyl radical, particularly alkanoyl (e.g. acetyl), aroyl (e.g. benzoyl), alkylsufonyl (e.g. methanesulfonyl), or arylsulfonyl (e.g. benzenesulfonyl, or p-toluene-sulfonyl).

As a suitable radical for $R_2$ and $R_3$, when it stands for an alkyl radical, there may be mentioned such groups containing 1–7 carbon atoms (such as methyl, ethyl, n-propyl, isobutyl and the like). If $R_2$ and $R_3$ represents an aralkyl radical, it may stand preferably for an optionally substituted benzyl radical. As a suitable value for $R_2$ and $R_3$, if it stands for an aryl radical, there may be mentioned the phenyl radical. Said aryl and aralkyl radicals may be substituted by one, or more substituents, which may be the same, or different (such as alkyl, alkoxy, nitro, halogen, or hydroxy).

Particularly useful representatives of the new compounds of the Formula I are the following derivatives:

2-(naphthyl-1-amino)-4H-5,6-dihydro-1,3-thiazine;
2-(naphthyl-2-amino)-4H-5,6-dihydro-1,3-thiazine;
2-imino-3-(1-naphthyl)-tetrahydro-1,3-thiazine;
2-(2-methyl-naphthyl-1-amino)-4H-5,6-dihydro-1,3-thiazine;
2-(2-methoxy-naphthyl-1-amino)-4H-5,6-dihydro-1,3-thiazine;
2-(2-ethoxy-naphthyl-1-amino)-4H-5,6-dihydro-1,3-thiazine;
2-(4-chloro-naphthyl-1-amino)-4H-5,6-dihydro-1,3-thiazine;
2-(5-bromo-naphthyl-1-amino)-4H-5,6-dihydro-1,3-thiazine;
2-(5,6,7,8-tetrahydro-naphthyl-1-amino)-4H-5,6-dihydro-1,3-thiazine;
2-(5,6,7,8-tetrahydro-naphthyl-2-amino)-4H-5,6-dihydro-1,3-thiazine;
2-(1-acetyl-naphthyl-7-amino)-4H-5,6-dihydro-1,3-thiazine;

2-(4-acetyl-naphthyl-1-amino)-4H-5,6-dihydro-1,3-thiazine;
2-(naphthyl-1-amino)-4-phenyl-Δ²-thiazoline;
2-(naphthyl-1-amino)-4-ethyl-Δ²-thiazoline;
2-(5-nitro-naphthyl-1-amino)-4H-5,6-dihydro-1,3-thiazine and salts thereof.

The salts of the compounds of the Formulae I, II and III may be acid addition salts formed with inorganic acids, (e.g. hydrochloric acid, hydrogen bromide, sulfuric acid or phosphoric acid) or organic acids (e.g. acetic acid, tartaric acid, lactic acid, maleic acid or malonic acid).

According to a further feature of the present invention there is provided a process for the preparation of compounds of the Formulae I, II and III and salts thereof, which comprises (a) Reacting a thiourea derivative of the formula $R_1$—NH—CS—NH$_2$ (wherein $R_1$ has the same meaning as stated above) with a dihalogeno-compound of the formula $C_2H_3X_2R_2$ or $C_3H_5X_2R_3$ (wherein $R_2$ and $R_3$ have the same meaning as stated above, whereby the two halogen atoms X are attached to positions 1,2- in the formula $C_2H_3X_2R_2$ and to positions 1,3- in the formula $$C_3H_5X_2R_3)$$

or (b) Reacting a compound of the formula $R_1$—N=C=S (wherein $R_1$ has the same meaning as stated above) with an aminoalcohol of the formula $C_2H_3(OH)(NH_2)R_2$ (wherein $R_2$ has the same meaning as stated above and the amino and hydroxy groups are attached to positions 1,2-) or $C_3H_5(OH)(NH_2)R_3$ (wherein $R_3$ has the same meaning as stated above and the amino and hydroxy groups are attached to positions 1,3-) and cyclizing the thiourea-derivatives of the formula

or $R_1$—NH—CS—NH—$C_3H_5(OH)R_3$ thus obtained; or (c) Cyclizing a reactive ester of a thiourea derivative of the formula $R_1$—NH—CS—NH—$C_2H_3(OH)R_2$ or $R_1$—NH—CS—NH—$C_3H_5(OH)R_3$ (wherein $R_1$, $R_2$ and $R_3$ have the same meaning as stated above); or (d) Reacting an isothiocyanate of the formula $$R_1-N=C=S$$

or a thiourea derivative of the formula $$R_1\text{—NH—CS—NH}_2$$

(wherein $R_1$ has the same meaning as stated above) with a halogenoalkylamine of the formula $C_2H_3X(NH_2)R_2$ (wherein $R_2$ has the same meaning as stated above, X stands for halogen, whereby the halogen atom and the amino group are attached to positions 1,2-) or $$C_3H_5X(NH_2)R_3$$

(wherein $R_3$ and X have the same meaning as stated above and the halogen atom and the amino group are attached to positions 1,3-) or a salt thereof; or (e) Reacting a compound of the Formula IV

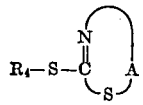 (IV)

(wherein $R_4$ stands for an alkyl group and A has the same meaning as stated above) with an amine of the formula $R_1$—NH$_2$ (wherein $R_1$ has the same meaning as stated above) or a salt thereof; or (f) Reacting an amine of the formula $R_1$—NH$_2$ (wherein $R_1$ has the same meaning as stated above) with an isothiocyanate of the formula $C_2H_3X(N=C=S)R_2$ or $C_3H_5X(N=C=S)R_3$ (wherein X, $R_2$ and $R_3$ have the same meaning as statet above); or (g) Reacting a compound of the Formula V

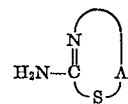 (V)

(wherein A has the same meaning as stated above) with an amine of the formula $R_1$—NH$_2$ (wherein $R_1$ has the same meaning as stated above) or a salt thereof.

If desired a compound thus obtained is converted into a salt thereof, or a compound of the Formula I is set free from its salt, or a salt is transformed into an other salt.

According to method (a) of the process according to the present invention thiourea derivatives of the formula $R_1$—NH—CS—NH$_2$ are reacted with dihalogeno-compounds of the formula $C_2H_3X_2R_2$ or $C_3H_5X_2R_3$. In the case of the former formula the two halogen atoms are attached to positions 1,2- while in the compounds of the latter formula they are bond to positions 1,3-. Accordingly the general formula $C_2H_3R_2$ corresponds to the structural formula —CH$_2$—CH(R$_2$)— and the general formula $C_3H_5R_3$ corresponds to one of the structural formula —CH$_2$—CH(R$_3$)—CH$_2$— or $$\text{—CH}(R_3)\text{—CH}_2\text{—CH}_2\text{—}$$

Thus the dihalogeno-compounds used as starting material have a structural formula X—CH$_2$CH(R$_2$)—X,
X—CH$_2$—CH(R$_3$)—CH$_2$—X or
X—CH(R$_3$)—CH$_2$—CH$_2$—X According to methods (b), (c), (d), and (f) of our process the designation $C_2H_3R_2$ and $C_3H_5R_2$ used in the formulae of the starting materials corresponds to the structural formulae set forth in the previous paragraph. In method (b) the hydroxy and amino group, in method (c) the reactive ester groups of the hydroxy group (hydrogen sulfate, dihydrogen-phosphate, halogen, etc.) and the $R_1$—NH—CS—NH— group, in method (d) the halogen atom and the amino group, while in method (f) the halogen atom and the —N=C=S group correspond to the two halogen atoms according to method (a).

According to method (a) of the process, it is preferred to use as starting material dihalogeno-compounds, wherein X is chlorine or bromine. The reaction is carried out preferably in an organic solvent as medium. A particularly preferred form of realization of the process comprises the use of an excess of the dihalogeno-compound as solvent, whereby said compound acts both as starting material and medium. The reaction may be carried out preferably at higher temperatures, generally above 80° C. and particularly at the reflux temperature of the reaction mixture.

According to the first step of method (b) of the process of the present invention an isothiocyanate of the formula $R_1$—N=C=S is reacted with an aminoalcohol of the formula $C_2H_3(OH_2)(NH_2)R_2$ or $C_3H_5(OH)(NH_2)R_3$. The formation of the hydroxyalkylthiourea-derivative is accomplished preferably in the presence of an organic solvent, such as an alcohol, e.g. methanol or ethanol; ethers, preferably diethylether, dioxane, or tetrahydrofurane; hydrocarbons, such as benzene or toluene; or halogenated hydrocarbons, such as chloroform. The reaction may be accomplished conveniently at higher temperatures in the range of about 60–120° C., particularly at the reflux temperature of the reaction mixture.

In the second step the thiourea derivatives of the formula $R_1$—NH—CS—NH—$C_2H_3(OH)R_2$ or $$R_1\text{—NH—CS—NH—C}_3H](OH)R_3$$

are subjected to ring closure after or without isolation. The cyclization may be carried out preferably by heating the thiourea derivative in the presence of a mineral acid. For this purpose it is preferred to use hydrochloric acid, sulfuric acid or phosphoric acid. The reaction may be carried out conveniently in aqueous medium at a higher temperature, preferably above 60° C. One may also proceed by using inorganic acid chlorides, preferably thionyl-chlroide as cyclization agent.

According to method (c) of our processs reactive esters of thiourea-derivatives of the formula $$R_1—NH—CS—NH—C_2H_3—(OH_2)R_2$$

or $$R_1—NH—CS—NH—C_3H_5(OH)R_3$$

are subjected to cyclization. As reactive esters it is preferred to use the halogenides, hydrogensulfates, dihydrogenphosphates, methanesulfonates or p-toluene-sulfonates. The esters used as starting materials may be prepared by reacting a phenyl-isothiocyanate of the formula $R_1—N=C=S$ with the corresponding ester (halogenide, hydrogensulfate, dihydrogenphosphate, methanesulfonate, p-toluenesulfonate) of an aminoalcohol of the formula $C_2H_3(OH)(NH_2)R_3$ or $C_3H_5(OH)(NH_2)R_3$. One may proceed preferably by adding to the corresponding aminoalcohol-ester simultaneously a base (preferably aqueous sodium hydroxide solution) and an isothiocyanate of the formula $R_1—N=C=S$. The reaction may be carried out conveniently in a water-miscible medium, such as dioxane. The intermediate product thus obtained may be subjected to ring closure after or without isolation. Cyclization may be accomplished preferably in acidic medium, such as hydrochloric acid or sulfuric acid. The reaction may be carried out preferably at a higher temperature, above 60° C. and particularly at the boiling point of the reaction mixture.

According to method (d) of the process of the present invention an isothiocyanate of the formula $R_1—N=C=S$ or thiourea derivative of the formula $R_1NH—CS—NH_2$ is reacted with a halogenoalkylamine of the formula $$C_2H_3X(NH_2)R_2$$

or $C_3H_5X(NH_2)R_3$ or a salt thereof. It is preferred to use the corresponding chloro- or bromoalkylamines The halogenoalkylamine may be added preferably in the form of its salts, particularly in form of a hydrogen halogenide (e.g. hydrobromide). The reaction with the salt of the halogenalkylamine may be carried out in the melt preferably at a temperature above 150° C., particularly at 160–190° C. According to a very preferable form of realization of said method, the halogenoalkylamine is set free from its salt with a base (e.g. triethylamine) in the reaction mixture and is reacted with the isothiocyanate of the formula $R_1N=C=S$. The reaction may be carried out preferably in the presence of an organic solvent, such as chloroform, benzene or ethers.

According to method (e) of our process compounds of the Formula IV are reacted with amines of the formula $R_1—NH_2$ or salts thereof. In the Formula IV $R_4$ stands for an alkyl group (preferably methyl). In the course of the reaction alkylmercaptan is split off. The reaction may be carried out conveniently in the melt.

According to method (f) of our process amines of the formula $R_1—NH_2$ are reacted with isothiocyanates of the formula $C_2H_3X(N=C=S)R_2$ or $C_3H_5(N=C=S)R_3$. The reaction may be carried out preferably in an organic solvent as the medium. Examples of organic solvents, which may be used for this purpose are the following: alcohols (e.g. ethanol), hydrocarbons (e.g. benzene), halogenated hydrocarbons (e.g. chloroform), or ethers. The reaction is carried out preferably at a higher temperature, conveniently at the boiling point of the reaction mixture.

According to method (g) of our process compounds of the Formula V are reacted with amines of the formula $R_1—NH_2$ or salts thereof. The reaction may be carried out conveniently in the melt.

According to methods (b) to (g) of our process for structural reasons the tautomer compounds of the Formulae I and II are obtained. According to method (a) compounds of the Formula III are formed.

The compounds of the Formulae I, II and III thus obtained, may be converted into their salts of inorganic acids (e.g. hydrochloric acid, hydrogenbromide, sulfuric acid, phosphoric acid, etc.) or organic acids (e.g. benzoic acid, salicylic acid, 3-hydroxy-2-naphthoic acid, acetic acid, tartaric acid, lactic acid, maleic acid, malonic acid, etc.). Salt-formation may be carried out by methods known per se preferably by reacting the compound of the Formula I, II or III in an organic solvent medium with an approximately equivalent amount of the corresponding acid.

The compounds of the Formulae I, II and III and salts thereof possess valuable sedative, tranquillant, spasmolytic and prolonged hypotensive properties.

According to a further embodiment of the present invention there are provided pharmaceutical and veterinary compositions comprising as active ingredient at least one compound of the Formula I, II or III or a salt thereof in admixture with suitable inert nontoxic diluents or carriers. As diluent or carrier one may use conventional pharmaceutical diluents or carriers, such as water, polyalkyleneglycols, gelatine, sugar, magnesium stearate, talc, starch, magnesium carbonate etc. The compositions may be suitable for oral, parenteral or rectal application. The compositions may be finished in solid form (e.g. tablets, capsules, coated tablets, dragées, suppositories or powder mixtures) or liquid form (e.g. injectable preparations, solutions, suspensions, or emulsions). The compositions may optionally contain further additives (emulsifying, wetting, suspending or filling agents) and other pharmaceutically useful compounds.

The pharmaceutical and veterinary compositions may be prepared by methods known per se by admixing a compound of the Formula I, II or III or a salt thereof with suitable inert pharmaceutically acceptable solid or liquid carriers and/or diluents and if desired with other additives and finishing same into forms ready for pharmaceutical or veterinary use.

Further details of our invention are to be found in the examples. It is, however, by no means intended to limit the scope of our invention to the examples.

EXAMPLE 1

(a) 77 g. (0.416 mole) of 1-naphthyl-isothiocyanate (J. Chem. Soc., 1956, 659) are admixed with a solution of 33.57 g. of 3-amino-propanol and 570 ml. of 96% ethanol. The reaction mixture is refluxed for 4 hours. The solution is evaporated and the crystalline residue is recrystallized from 150 ml. of ethyl acetate. Thus 94.40 g. of N-(1-naphthyl)-N'-(3-hydroxypropyl)-thiourea are obtained. Yield 87.16%. M.P.: 115–116° C.

Analysis.—N=10.38% (calc. 10.76%).

(b) 94.40 g. of N-(1-naphthyl)-N'-(3-hydroxy-propyl)-thiourea and 610 ml. of concentrated hydrochloric acid are heated to boiling for half an hour. The transparent solution is evaporated in vacuo. The residue is crystallized from 200 ml. of anhydrous ethanol. Thus 92.10 g. of 2-(naphthyl-1-amino)-4H-5,6-dihydro - 1,3 - thiazine-hydrochloride are obtained. Yield 91.4%. M.P.: 221–222° C.

Analysis.—C=59.92% (calc. 60.30%); H=5.51% (calc. 5.42%); N=10.13% (calc. 10.05%); S=11.67% (calc. 11.50%); Cl<sup>−</sup>=12.81% (calc. 12.72%).

The pharmacological activity of the product is shown by the following data: In an oral dose of 10–20 mg./kg. it exhibits a narcosis-potentiating effect in mice and rats, it inhibits the phenmetrazine and morphine excitement and decreases spontaneous motility. The product inhibits spasums induced by electroshock and inhibits nicotine-lethality in an oral dose of 20–50 mg./kg. If administered in a 0.5–1 mg./kg. intravenous dose to narcotised cats, after a slight blood pressure increase lasting for 1–2 minutes it causes a considerable blood pressure decrease. A 1 mg./kg. dose of the product decreases blood pressure by an average 41 mm. Hg for 40 minutes; a 0.5 mg./kg. dose of the product exhibits said effect for 22 minutes.

(c) 1.81 g. of N-(1-naphthyl)-N'-(3-hydroxy-propyl)-thiourea are admixed with a mixture of 10 ml. of concentrated sulfuric acid and 40 ml. of water and heated to boiling for an hour. The clear solution formed is made alkaline with aqueous ammonia under cooling. The precipitated product is isolated by filtration. Thus 1.57 g. of 2-(naphthyl-1-amino)-4H-5,6-dihydro-1,3-thiazine are obtained. Yield 93%. M.P.: 117° C. (from ethylacetate and ethanol).

*Analysis.*—N=11.03% (calc. 11.15%); S=13.13% (calc. 13.23%).

(d) The above base is converted into acid addition salts by reacting same with the corresponding acid in alcohol as medium. The melting point of the benzylate, 3-hydroxy-2-naphthoate and salicylate amounts to 183–184° C. 196° C. and 157–158° C. respectively.

(e) A mixture of 0.04 g. (0.02 mole) of 1-naphthyl-thiourea and 4.38 g. (0.02 mole) of 3-bromopropyl-amine-hydrobromide are heated in an oil bath of 170–180° C. for half an hour. The residue is dissolved in 50 ml. of warm water, treated with activated charcoal and the filtrate is made alkaline. Water is removed from above the precipitated product by decanting and the residue is recrystallized from anhydrous ethanol. The M.P. of the 2 - (naphthyl - 1 - amino) - 4H-5,6-dihydro-1,3-thiazine amounts to 119–121° C.

(f) A mixture of 1.80 g. (0.01 mole) of 1-naphthyla-mine-hydrochloride and 1.48 g. (0.01 mole) of 2-methyl-mercapto-4H-5,6-dihydro-1,3-thiazine (prepared as described in J. Chem. Soc., 1943, 243) is heated in an oil bath of 160–165° C. for an hour. The product is dissolved in N hydrochloric acid, the warm solution is clarified, the filtrate is made alkaline, and the precipitated base is extracted with ethyl acetate. After removing the solvent the residue is treated with alcohol containing hydrochloric acid. The M.P. of the 2-(naphthyl-1-amino)-4H-5,6-dihydro-1,3-thiazine-hydrochloride amounts to 220–221° C.

(g) To a mixture of 6.60 g. (0.03 mole) of bromo-propylamine-hydrobromide and 6.0 g. (0.0324 mole) of 1-naphthyl-isothiocyanate and 20 ml. of chloroform 4.2 ml. (0.05 mole) of triethylamine are added dropwise under stirring and cooling (5–10° C.) whereupon stirring is continued at room temperature for 4 hours. The solvent is distilled off and the triethylamine salt is dissolved by washing the residue with a small amount of cold water. Thus 8.35 g. of 2-(naphthyl-1-amino)-4H-5,6-dihydro-1,3-thiazine-hydrobromide are obtained. Yield: MP.: 235–237° C. (from ethanol).

(h) 3.2 g. (0.0177 mole) of 3-bromo-propyl-isothio-cyanate (prepared as disclosed in Acta Chem. Scand., 19 (1965, 766) and 2.55 g. (0.018 mole) of 1-naphthylamine are heated to boiling in 16 ml. ethanol for 5 hours, whereupon the solvent is evaporated and the residue is triturated with acetone. After filtration 4.8 g. of 2-(naphthyl-1-amino)-4H-5,6-dihydro-1,3-thiazine - hydrobromide are obtained. Yield 84%. M.P.: 235–237° C. (from ethyl acetate).

(i) To a solution of 3.46 g. (0.02 mole) of 3-amino-propyl-dihydrogenphosphate-hydrate (prepared as described in Helv. Chim. Acta, 49 (1966), 2612) 80 ml. of water and 60 ml. of dioxane 20 ml. 2 N sodium hydroxide and a solution of 4.27 g. (0.022 mole) of naphthyl-1-isothiocyanate formed with 40 ml. of dioxane are added dropwise from two dropping funnels simultaneously under stirring at 50° C. so that the pH value should be between 9 and 10. After finishing the reaction (4–5 hours) the mixture is evaporated in vacuo, the residue is dissolved in water, filtered and the filtrate is evaporated again in vacuo. The residue is washed with a small amount of alcohol and hot ether, whereupon it is dried. Thus 6.4 g. of disodium-γ-(naphthyl - 1) - thiourea-amino - propyl-phosphate-monohydrate are obtained. Yield 80%.

*Analysis.*—C=41.71% (calc. 41.90%); H=4.09% (calc. 3.93%); N=7.21% (calc. 6.90%); S=7.99% (calc. 7.99%).

(j) 4.01 g. (0.01 mole) of the above diisodium compound are heated in 50 ml. of N hydrochloric acid for 40 minutes, whereupon the reaction mixture is evaporated in vacuo, the residue is taken up in 25 ml. of hot water, clarified with activated charcoal, filtered and the filtrate is made alkaline. The precipitated product is filtered and crystallized from alcohol. The melting point of the 2-(naphthyl-1-amino)-4H-5,6-dihydro-1,3-thiazine thus obtained amounts to 119–121° C.

(k) 1.97 g. (0.01 mole) of 2-amino-4H-5,6-dihydro-1,3-thiazine-hydrobromide (prepared as described in Ann., 614, (1958), 83) are dissolved in 5 ml. of anhydrous ethanol, whereupon a solution of 0.56 g. (0.01 mole) of potassium hydroxide and 25 ml. of anhydrous ethanol is added. The reaction mixture is allowed to stand for a short time, whereupon the precipitated potassium bromide is filtered off and the filtrate is evaporated to dryness in vacuo. To the residue 4.29 g. (0.03 mole) of 1-naphthyla-mine are added and the mixture is heated on an oil bath of 180–200° C. for 5 hours. The excess of 1-naphthyl-amine is removed from the product by means of steam distillation, whereupon the residue, which has been evaporated to dryness, is recrystallized from ethyl acetate. The melting point of the 2-(naphthyl-1-amino)-4H-5,6-dihydro-1,3-thiazine thus obtained amounts to 117–118 C.

EXAMPLE 2

(a) 13.40 g. (0.0725 mole) of 2-naphthyl-isothio-cyanate (J. Chem. Soc. 1956, 659) and 5.46 g. (0.0725 mole) of 3-amino-propanol are refluxed in 100 ml. of 96% ethanol for 24 hours. The solvent is distilled off and the residue is recrystallized from 60 ml. of ethyl acetate. Thus 14.75 g. of N-(2-naphthyl)-N'-(3-hydroxy-propyl)-thiourea are obtained. Yield: 78.3%. M.P.: 119–120° C.

*Analysis.*—C=64.48% (calc. 64.58%); H=6.42% (calc. 6.20%); N=10.65% (calc. 10.76%).

(b) 14.75 g. (0.056 mole) of N-(2-naphthyl)-N'-(3-hydroxy-propyl)-thiourea and 120 ml. of concentrated hydrochloric acid are heated to boiling for 15 minutes, the solution is filtered and the clear filtrate is made alkaline with 5 N sodium hydroxide. Thus 12.80 g. of 2-(naphthyl-2-amino)-4H-5,6-dihydro-1,3-thiazine are obtained. Yield 93%. After crystallisation from methanol the product melts at 163–164° C.

The base is converted into the hydrochloride with anhydrous ethanol containing hydrochloric acid. M.P.: 188–190° C.

*Analysis.*—C=60.54% (calc. 60.30%); H=5.69% (calc. 5.42%); S=11.65% (calc. 11.50%); Cl⁻=13.15% (calc. 12.72%).

EXAMPLE 3

To 5.4 g. (0.027 mole) of 1-naphthyl-thiourea 30 ml. of 3-chloro-1-bromo-propane are added and the reaction mixture is refluxed for 6 hours. After cooling 7.55 g. of 2 - imino - 3 - (1 - naphthyl) - tetrahydro - 1,3 - thiazine - hydrobromide are obtained. Yield 87.3%.

*Analysis.*—C=52.30% (calc. 52.01%); H=4.76% (calc. 4.67%); N=8.48% (calc. 8.67%); S=10.08% (calc. 9.62%); Br⁻=24.65% (calc. 24.72%).

3.0 g. of the hydrobromide are treated in aqueous solution with 10% sodium-hydroxide solution. The melting point of the free base thus obtained (1.80 g.) amounts to 150–152° C. (from anhydrous ethanol).

*Analysis.*—C=68.97% (calc. 69.38%); H=6.07% (calc. 5.82%); N=11.37% (calc. 11.56%); S=13.12% (calc. 13.23%).

EXAMPLE 4

3.76 g. (0.05 mole) of 3-amino-propanol and 9.96 g. (0.05 mole) of (2-methyl-naphthyl-1)-isothiocyanate are heated in 60 ml. of anhydrous ethanol for 4 hours on a water bath. After evaporating the ethanol 50 ml. of concentrated hydrochloric acid are poured onto the residue and the mixture is heated to boiling for half an hour. A clear solution is obtained from which the aqueous hydrochloric acid is removed by distillation. The residue is dissolved in water and the solution is made alkaline with 5 N sodium hydroxide. Thus 11.96 g. of 2-(2-methyl-naphthyl-1-amino)-4H-5,6-dihydro-1,3-thiazine are obtained. Yield 93%. After crystallization from methanol the melting point amounts to 147° C.

*Analysis.*—N=10.78% (calc. 10.93%); S=12.46% (calc. 12.62%).

The hydrochloride of the base is formed in ethyl acetate as medium by adding ethyl acetate containing hydrochloric acid. The melting point of the salt amounts to 219–220° C. (from acetonitrile).

*Analysis.*—C=61.34% (calc. 61.52%); H=5.76% (calc. 5.85%); S=11.05% (calc. 10.96%); Cl=11.93% (calc. 12.11%).

The (2-methyl-1-naphthyl)-isothiocyanate used as starting material may be prepared by heating the corresponding thiourea compound with chlorobenzene to boiling. M.P.: 58–60° C.

EXAMPLE 5

7.0 g. (0.0326 mole) of (2-methoxy-naphthyl-1)-isothiocyanate (prepared by heating the corresponding thiourea compound with chlorobenzene to boiling; M.P.: 71–73° C.) and 2.44 g. (0.0326 mole) of 3-amino-propanol are heated to boiling in ethanol for 2 hours. After removing the solvent by distillation the residue is heated with 30 ml. of concentrated hydrochloric acid to boiling for half an hour. The hydrochloric acid is distilled off, the residue is dissolved in water and the thiazine-base is precipitated by making the solution alkaline. The free base is dried and converted into the hydrochloride in ethyl acetate as medium by adding anhydrous ethanol containing hydrochloric acid. Thus 7.6 g. of 2-(2 - methoxy-naphthyl - 1 - amino) - 4H - 5,6 - dihydro - 1,3 - thiazine - hydrochloride are obtained. Yield 76%. M.P.: 211–212° C. (from a mixture of ethanol and ethyl acetate).

*Analysis.*—N=9.11% (calc. 9.07%); Cl⁻=11.88% (calc. 11.68%); S=10.43% (calc. 10.38%).

EXAMPLE 6

The 2 - (2 - ethoxy - naphthyl - 1 - amino) - 4H - 5,6 - dihydro-1,3-thiazine-hydrochloride is prepared in a similar way to the process described in Example 5. M.P.: 193–194° C.

*Analysis.*—N=8.40% (calc. 8.68%); Cl⁻=11.02% (calc. 10.98%); S=9.98% (calc. 10.16%).

EXAMPLE 7

(a) 7 g. (0.032 mole) of (4-chloro-naphthyl-1)-isothiocyanate (prepared by heating the corresponding thiourea-compound with chlorobenzene to boiling) and 2.4 g. (0.032 mole) of 3-amino-propanol are heated in 43 ml. of ethanol. The solution is evaporated and the residue is crystallized from acetonitrile. Thus 7.85 g. of N-(4-chloro - naphthyl - 1) - N' - (3 - hydroxy - propyl) - thiourea are obtained. M.P.: 89–91° C.

(b) 7.05 g. (0.024 mole) of N-(4-chloro-naphthyl-1)-N'-(3-hydroxy-propyl)-thiourea are heated with 44 ml. of concentrated hydrochloric acid to boiling. The aqueous hydrochloric acid is distilled off in vacuo and the residue is crystallized from acetonitrile. Thus 5.2 g. of 2-(4-chloro-naphthyl - 1 - amino) - 4H - 5,6 - dihydro - 1,3 - thiazine - hydrochloride are obtained. M.P.: 225–226° C.

*Analysis.*—C=53.29% (calc. 53.68%); H=4.38% (calc. 4.50%); N=8.76% (calc. 8.94%); S=10.14% (calc. 10.24%); Cl⁻=10.97% (calc. 11.32%).

EXAMPLE 8

7.35 g. (0.0284 mole) of (5-bromo-naphthyl-1-)-isothiocyanate (prepared by heating the corresponding thiourea derivative with chlorobenzene to boiling. M.P. 98–99° C.) and 2.15 g. of aminopropanol are heated to boiling in ethanol for 2 hours. After removing the ethanol by distillation the residue is heated to boiling with 40 ml. of concentrated hydrochloric acid for 10 minutes and the solution is made alkaline with ammonia. Thus 7.0 g. of 2-(5-bromo-naphthyl-1-amino)-4H-5,6 - dihydro - 1,3-thiazine are obtained. The product may be crystallized from ethanol. Yield 77%.

*Analysis.*—N=8.76% (calc. 8.72%); Br=24.78% (calc. 24.88%).

EXAMPLE 9

(a) 7.15 g. (0.0378 mole) of (5,6,7,8 - tetrahydro-naphthyl-1)-isothiocyanate and 2.85 g. of 3-amino-propanol are heated in 25 ml. of ethanol to boiling for half an hour. After cooling the precipitated N-(5,6,7,8-tetrahydro-naphthyl - 1) - N' - (3-hydroxy-propyl)-thiourea is filtered off. Thus 6.1 g. of the above product are obtained. Yield 61%. M.P. 118–119° C. which does not change after repeated recrystallizations.

*Analysis.*—N=1032% (calc. 10.59%); S=11.87% (calc. 12.13%).

(b) 5.5 g. of N-(5,6,7,8-tetrahydro-naphthyl-1-)-N'-3-hydroxy-propyl)-thiourea and 30 ml. of concentrated hydrochloric acid are heated to boiling for half an hour, whereupon the hydrochloric acid is distilled off. The residue is dissolved in water and the solution is made alkaline. The precipitated product is filtered. Thus 4.0 g. of 2-(5,6,7,8 - tetrahydro-naphthyl - 1 - amino)-4H-5,6-dihydro-1,3-thiazine are obtained. Yield 78%. M.P 152° C. (from anhydrous ethanol).

*Analysis.*—C=68.60% (calc. 68.25%); H=7.57% (calc. 7.36%); N=11.37% (calc. 11.37%); S=12.18% (calc. 13.01%).

The isothiocyanate used according to method (a) of this example is prepared from 1 - amino - 5,6,7,8-tetrahydronaphthalene through the thiourea compound. (J. Chem. Soc., 1950, 1331.).

EXAMPLE 10

(a) 7.15 g. (0.0378 mole) of (5,6,7,8 - tetrahydronaphthyl - 2) - isothiocyanate (prepared in a way similar to the method described in Example 9) and 2.85 g. of 3-amino-propanol are heated in 25 ml. of anhydrous ethanol to boiling for half an hour. Thus 6.0 g. of crystalline N-(5,6,7,8 - tetrahydro - naphthyl - 2) - N' - (3-hydroxy-propyl) - thiourea are obtained. Yield 60%. M.P.: 120–122° C.

*Analysis.*—N=10.30% (calc. 10.59%); S=11.95% (calc. 12.13%).

(b) 5.0 g. of the product prepared according to paragraph (a) are heated to boiling in 35 ml. of concentrated hydrochloric acid for half an hour and the mixture is evaporated. The residue is dissolved in water and made alkaline. Thus 4.15 g. of 2 - (5,6,7,8-tetrahydro-naphthyl-2 - amino) - 4H - 5,6 - dihydro-1,3-thiazine are obtained. M.P.: 123–124° C. (from anhydrous ethanol).

*Analysis.*—C=67.92% (calc. 68.25%); H=7.45% (calc. 7.36%); N=11.49% (calc. 11.37%); S=12.89% (calc. 13.01%).

EXAMPLE 11

(a) 6.15 g. (0.027 mole) of (1 - acetyl - naphthyl-7)-isothiocyanate ( this compound is prepared from 1-acetyl-7-naphthylamine—J. Am. Chem. Soc., 71, 1392 (1949) by thiourea formation with ammoniumrodanide, benzoyl chloride and a base and thereafter isothiocyanate formation) 2.05 g. of 3-amino-propanol are heated to boiling in 30 ml. of anhydrous ethanol for half an hour. On cooling 6.3 of N - (1 - acetyl - naphthyl - 7)-N'-(3-hydroxy-propyl)-thiourea precipitate. Yield 75.5%. M.P.: 133° C.

*Analysis.*—N=9.39% (calc. 9.26%); S=10.14% (calc. 10.60%).

(b) 6.0 g. (0.02 mole) of N - ( 1 - acetyl-naphthyl-7)-N'-(3-hydroxy-propyl)-thiourea are heated to boiling in 42 ml. of concentrated hydrochloric acid for half an hour. The reaction mixture is evaporated in vacuo and the residue is crystallized from anhydrous ethanol. Thus 4.7 g. of 2 - (1 - acetyl-naphthyl - 7-amino)-4H-5,6-dihydro-1,3-thiazine-hydrochloride are obtained. M.P. 225–227° C. Yield: 73.5%.

*Analysis.*—C=59.61% (calc. 59.89%); H=5.22% (calc. 5.34%); S=9.98% (calc. 9.99%); Cl⁻=11.28% (calc. 11.05%).

EXAMPLE 12

(a) 12.0 g. (0.053 mole) of (1-acetyl-naphthyl - 4)-isothiocyanate (prepared similarly to the process described in the preceding example) and 4.0 g. of 3-amino-propanol are heated to boiling in 50 ml. of anhydrous ethanol for 30 minutes. On cooling 7.65 g. of N-(1-acetyl-naphthyl-4) - N' - (3 - hydroxy - propyl) - thiourea precipitates in crystalline form. Yield 47.7%. M.P.: 186° C. (from the mother liquor a second crop may be isolated).

*Analysis.*—N=9.33% (calc. 9.26%); S=10.57% (calc. 10.60%).

(b) 7.0 g. (0.0232 mole) of the thiourea derivative prepared according to paragraph (a) are refluxed with 50 ml. of concentrated hydrochloric acid for half an hour. The reaction mixture is evaporated, the residue is dissolved in water and made alkaline. The precipitated product is recrystallized from 60 ml. of anhydrous ethanol. Thus 4.0 g. of 2 - (1 - acetyl - naphthyl - 4 - amino)-4H-5,6-dihydro-1,3-thiazine are obtained. Yield 60.3%.

The hydrochloride is prepared by dissolving the base and adding first anhydrous ethanol containing hydrochloric acid and than ether. The product may be crystallized from isopropanol. M.P.: 218–220° C.

*Analysis.*—C=60.34% (calc. 58.89%); H=5.28% (calc. 5.34%); N=8.70% (calc. 8.73%); S=9.73% (calc. 9.99%); Cl⁻=11.44% (calc. 11.05%).

EXAMPLE 13

To 6.76 g. (0.0363 mole) of 1 - naphthyl - isothiocyanate an alcoholic solution of 5.00 g. (0.0365 mole) of 2-amino-2-phenyl-ethanol is added and the reaction mixture is heated to boiling for 4 hours. The solution is filtered, evaporated and the residue is heated to boiling with 70 ml. of concentrated hydrochloric acid for half an hour. The aqueous hydrochloric acid is distilled off and the residue is crystallized from acetonitrile. Thus 6.15 g. of 2 - (naphthyl - 1 - amino) - 4-phenyl-Δ²-thiazoline hydrochloride are obtained. M.P. 188–190° C. Yield 49.6%.

*Analysis.*—C=66.70% (calc. 66.95%); H=4.92% (calc. 5.02%); N=8.09% (calc. 8.22%); S=9.17% (calc. 9.41%); Cl⁻=10.67% (calc. 10.40%).

EXAMPLE 14

(a) 9.26 g. (0.05 mole) of 1-naphthyl-isothiocyanate are heated to boiling with a solution of 4.46 g. (0.05 mole) of 2-amino-butanol and 100 ml. ethanol for 3 hours. On cooling a white crystalline substance precipitates. Thus 11.83 g. of N-(1-naphthyl)-N'-(1-hydroxy-butyl-2)-thiourea are obtained. M.P.: 153–154° C. Yield 86.5.

*Analysis.*—N=9.56% (calc. 10.21%); S=11.50% (calc. 11.69%).

(b) 10.63 g. (0.039 mole) of the above thiourea-derivative are heated to boiling with 70 ml. of concentrated hydrochloric acid for half an hour. The hydrochloric acid is distilled off and the residue is dissolved in 50 ml. of anhydrous ethanol. On adding 25 ml. of 2 N sodium hydroxide solution 8.8 g. of 2-(naphthyl-1-amino)-4-ethyl-Δ²-thiazoline precipitate. Yield 88%. M.P.: 130–132° C.

*Analysis.*—C=70.13% (calc. 70.26%); H=6.20% (calc. 6.29%); N=10.72% (calc. 10.93%); S=12.24% (calc. 12.50%).

EXAMPLE 15

2.65 g. (0.0158 mole) of 3-bromo-propyl-isothiocyanate (prepared as described in Acta Chem. Scand., 19 (1965), 766) and 2.85 g. (0.0153 mole) of 5-nitro-1-naphthyl-amine (preparation described in J. Chem. Soc., 1943, 319) are heated to boiling in 160 ml. of anhydrous ethanol for 5 hours under reflux. The reaction mixture is evaporated in vacuo. The residue is extracted with hot water, whereupon the aqueous solution is made alkaline with a saturated sodium hydrogen carbonate solution. Thus 1.4 g. of 2-(5-nitro-naphthyl-1-amino)-4H-5,6-dihydro-1,3-thiazine are obtained, which may be isolated by filtration. Yield 31.5%. After recrystallization from isopropanol the melting point amounts to 158–159° C.

*Analysis.*—C=58.43% (calc. 58.82%); H=4.51% (calc. 4.56%); N=14.97% (calc. 14.62%); S=10.92% (calc. 11.16%).

What we claim is:

1. A compound selected from the group which consists of a compound of the formula

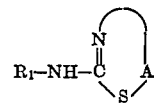

wherein $R_1$ stands for naphthyl, the 5,6,7,8 hydrogenated naphthyl radical, or a 2-methyl, 2-methoxy, 4-chloro, 5-bromo, 5-nitro or 1-acetyl substituted naphthalene group, and A stands for a group of the formula

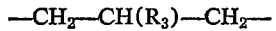

or —CH($R_3$)—CH$_2$—CH$_2$—, wherein $R_3$ stands for the hydrogen atom or an alkyl group having 1 to 7 carbon atoms, and the pharmaceutically acceptable acid addition salts of the compound of said formula.

2. The compound defined in claim 1 which consists of 2-(naphthyl-1-amino)-4H-5,6-dihydro-1,3-thiazine.

3. The compound defined in claim 1 which consists of 2-(naphthyl-2-amino)-4H-5,6-dihydro-1,3-thiazine.

4. The compound defined in claim 1 which consists of 2-(2 - methyl - naphthyl - 1 - amino)-4H-5,6-dihydro-1,3-thiazine.

5. The compound defined in claim 1 which consists of 2-(2-methoxy - naphthyl - 1 - amino)-4H-5,6-dihydro-1,3-thiazine.

6. The compound defined in claim 1 which consists of 2-(2 - ethoxy - naphthyl - 1 - amino)-4H-5,6-dihydro-1,3-thiazine.

7. The compound defined in claim 1 which consists of 2-(4 - chloro - naphthyl - 1 - amino)-4H-5,6-dihydro-1,3-thiazine.

8. The compound defined in claim 1 which consists of 2-(5 - bromo - naphthyl - 1 - amino)-4H-5,6-dihydro-1,3-thiazine.

9. The compound defined in claim 1 which consists of 2 - (5,6,7,8 - tetrahydro-naphthyl-1-amino)-4H-5,6-dihydro-1,3-thiazine.

10. The compound defined in claim 1 which consists of 2-(5,6,7,8-tetrahydro - naphthyl - 2 - amino)-4H-5,6-dihydro-1,3-thiazine.

11. The compound defined in claim 1 which consists of 2-(1 - acetyl - naphthyl - 7 - amino)-4H-5,6-dihydro-1,3-thiazine.

12. The compound defined in claim 1 which consists of 2-(4 - acetyl - naphthyl - 1 - amino)-4H-5,6-dihydro-1,3-thiazine.

13. The compound defined in claim 1 which consists of 2 - (5 - nitro - naphthyl - 1 - amino)-4H-5,6-dihydro-1,3-thiazine.

References Cited
UNITED STATES PATENTS
| | | | |
|---|---|---|---|
| 3,227,713 | 1/1966 | Behner et al. | 260—243 |
| 3,228,935 | 1/1966 | Behner et al. | 260—243 |
| 3,408,348 | 10/1968 | Martin et al. | 260—243 |
| 3,502,666 | 3/1970 | Kuch et al. | 260—243 |

FOREIGN PATENTS
| | | | |
|---|---|---|---|
| 1,356,908 | 2/1964 | France | 260—306.7 |

OTHER REFERENCES
Najer et al.: Bull. Soc. Chim., France (1960), pp. 960–3.

JOHN M. FORD, Primary Examiner

U.S. Cl. X.R.

260—306.7; 424—246, 270